Inventors:
Marvin E. Gale,
Frank W. Warner,
by
Their Attorney.

May 24, 1949.　　M. E. GALE ET AL　　2,471,148
SPRUE CUTTER FOR TRANSFER MOLDING DEVICES
Filed Jan. 6, 1948　　2 Sheets-Sheet 2

Inventors:
Marvin E. Gale,
Frank W. Warner,
by
Their Attorney.

Patented May 24, 1949

2,471,148

UNITED STATES PATENT OFFICE 2,471,148

SPRUE CUTTER FOR TRANSFER MOLDING DEVICES

Marvin E. Gale and Frank W. Warner, Pittsfield, Mass., assignors to General Electric Company, a corporation of New York Application January 6, 1948, Serial No. 766

1 Claim. (Cl. 18—30)

This invention relates to apparatus for molding plastics of the thermosetting organic type, and more particularly to an improved apparatus for molding thermosetting plastics in which the molding compound is first plasticized or rendered fluent and then transferred under pressure to a closed die or mold.

In the molding of plastics by the method commonly known in the art as transfer molding, the molding compound is placed in a pressure chamber or reservoir, generally known as a transfer well, and is there converted to a plastic state by means of heat supplied to the walls of the well and pressure exerted by a plunger or piston acting on the compound. The movement of the plunger forces the plastic molding compound through a passage or sprue of relatively small cross-sectional area into the cavity of a closed mold or die where the compound is converted to a hard, infusible state by heat supplied to the walls of the mold. During the curing of the compound in the mold, the residue of the compound remaining in the transfer well, commonly referred to as the cull, and also the compound filling the passage between the transfer well and the mold likewise cures. When the mold is opened and the molded part is removed, a small column of cured plastic, or sprue, which is a portion of the compound cured in the passage leading from the transfer well to the mold cavity, remains attached to the molded part. The removal of this sprue from the molded part constitutes an additional step in the production of the final part and ordinarily entails a great deal of time, labor and expense as compared with the molding operation itself. Removal of the sprue is frequently largely a hand operation and involves cutting, grinding or polishing operations, or a combination of such operations. Furthermore, the molded parts are frequently marred during the removal of the sprue so that the resulting poor appearance or dimensional changes may necessitate their rejection as being unsuitable for the purpose which the molded part is ultimately intended to serve.

It is, therefore, an object of this invention to provide an improved apparatus for transfer molding thermosetting organic plastics, by means of which the necessity for removing sprues from molded parts after the completion of the molding operation is eliminated.

It is also an object to provide an apparatus for producing transfer molded parts free of attached sprues.

Other objects and advantages of our invention will be apparent from the detailed description which follows and the accompanying drawings illustrating the apparatus of our invention. In the drawings.

Figure 1:
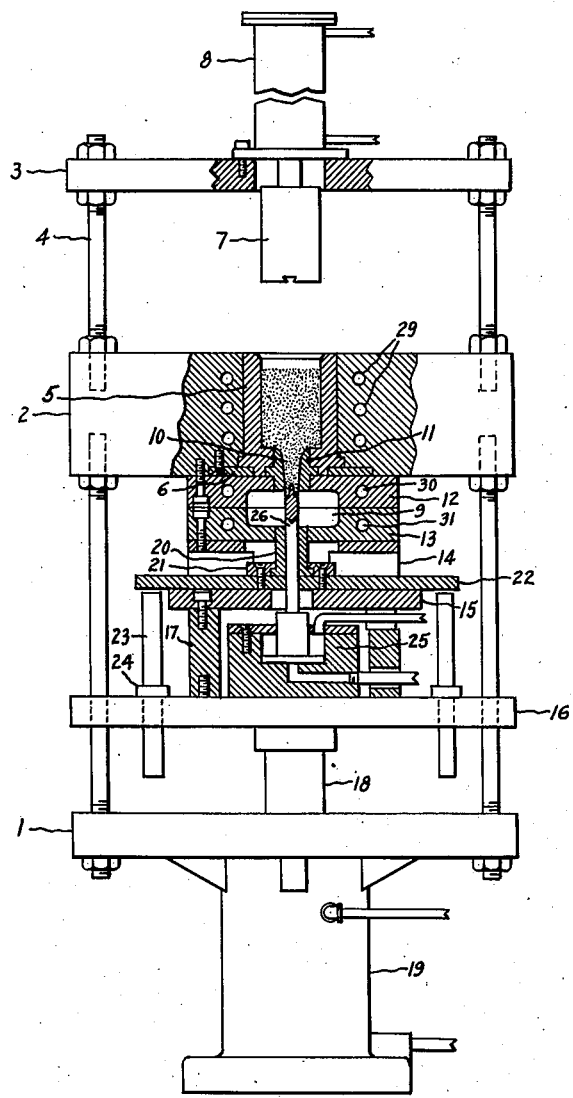
Fig. 1 is a view in side elevation, partially in section, of a molding machine embodying our invention and including a mold for producing a caster wheel having an opening therethrough to receive an axle or shaft.

The molding machine illustrated in Fig. 1 includes a base 1, a transfer well retainer 2, provided with heating passages 29 and a press head 3 mounted in fixed spaced relation on supporting rods 4. Transfer well or pressure chamber 5 is secured in the transfer well retainer by means of supporting ring 6. Plunger 7 actuated by the hydraulic cylinder and piston assembly 8 fixed to the press head is arranged, as shown, to permit entrance of the plunger into the transfer well. The transfer well communicates with mold cavity 9, defined by mold force 12 and mold shoe 13, through passage 10 in sprue bushing 11 which fits tightly in both the transfer well retainer and the mold force. The mold force, which is also provided with heating passages 30, is secured to the underside of the transfer well retainer and hence remains stationary during the operation of the machine.

The mold shoe, provided with heating passages 31, is mounted on a supporting member 14 which in turn is secured to mold plate 15. An aperture is provided in member 14, as shown, in the accompanying drawings, to permit movement of the ejector pin retainer 21 and ejector pin 20 as will hereinafter more fully be described. Mold plate 15 is mounted on the moving press platen 16 by means of parallel supporting members 17. The moving press platen is apertured to receive the supporting rods 4 which guide the movement of the platen. Ram 18 and cylinder 19 are provided in the base assembly of the machine for the purpose of moving the movable press platen and mold shoe during the operation of the machine.

The ejector pin 20 is secured to ejector bar 22 by means of ejector pin retainer 21 and is arranged to move in an aperture in the mold shoe when the movement of the press platen 16 causes the ends of vertical members 23 to be forced against the ejector bar. The vertical members 23 are slidably mounted in apertures provided in the press platen and are maintained in position when the mold is closed by enlarged sections or collars 24.

Figure 2:
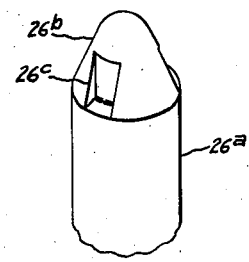
Fig. 2 is an enlarged perspective view of a portion of the sprue cut-off pin which is an essential element of the invention.

A hydraulic cylinder and piston assembly 25 is mounted on the movable press platen below the mold shoe and lower mold plate arranged, as shown in the drawings, to move sprue cut-off pin 26 vertically. The sprue cut-off pin slidably fits in an aperture which extends axially through the ejector pin and is aligned with the exit of the passage into the mold cavity, the upper end of the cut-off pin being tapered or otherwise of reduced cross-section to facilitate entrance of the pin into the passage in the sprue bushing when the cut-off pin is advanced to its final position and permits movement of the plasticized material through the passage in the sprue bushing when it is in its initial or retracted position. The lateral surfaces of the cut-off pin define a portion of the mold cavity and may be of any desired configuration. By way of example, the cut-off pin illustrated in Fig. 2 is characterized by a cylindrical lateral surface 26a defining the central opening for a shaft or axle in the molded caster and a rounded, tapered end 26b. One or more grooves or channels 26c may be provided in the tapered end to afford the desired flow of plasticized material from the transfer well to the mold cavity. The lower portion of the passage through the sprue bushing or exit of the passage into the mold cavity and the aperture in the ejection pin correspond in cross-section to the cross-section of the sprue cut-off pin so that the plasticized material cannot escape through the ejector pin aperture and the sprue is effectively cut off when the mold is closed and the plastic in the mold is under heat and pressure.

Figure 3:
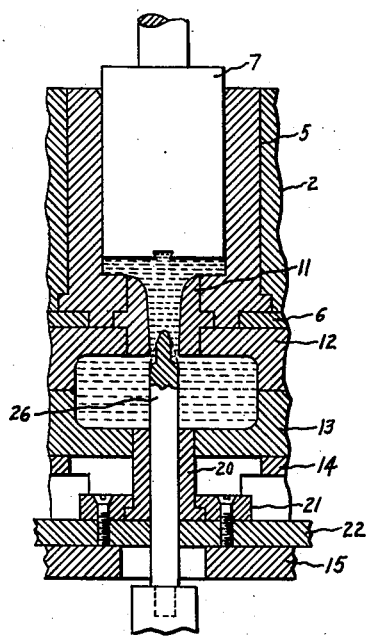
Fig. 3 is an enlarged sectional view of a portion of Fig. 1 showing the transfer well, mold, and sprue cut-off pin in the initial position. In this figure the mold is shown in the closed position immediately after the plasticized molding compound has been transferred from the pressure chamber to the mold cavity.

In operation, the organic molding compound preheated, if desired, in granular or other solid form is placed in the transfer well 5 with the mold cavity closed, the mold shoe being held securely against the mold force by the cylinder 19 and ram 18 as shown in Fig. 1. After the desired amount of molding compound has been placed in the transfer well, the plunger 7 is forced into the well and pressure is applied to the compound by means of the hydraulic cylinder and piston arrangement 8. The heat from the heating passages in transfer well retainer 2 and the pressure exerted by the plunger cause the molding compound to become plastic or fluent and flow through the passage 10 in sprue bushing 11 into mold cavity 9. During the passage of the plasticized molding compound into the mold cavity, sprue cut-off pin 26 is in its initial or retracted position, as shown in Fig. 3, so that the tapered end of the pin projects into the exit of the passage in the sprue bushing.

Figure 4:
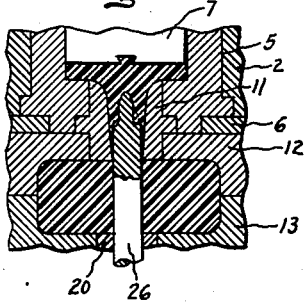
Fig. 4 is an enlarged view in cross section showing the mold, sprue cut-off pin in the advanced or final position, and lower portion of the transfer well with the molded part in the mold.

When the mold cavity is filled, preventing further descent of the plunger into the transfer well, the sprue cut-off pin is forced upward into the sprue bushing by means of the cylinder and piston assembly 25 so that the lateral surface 26a of the cut-off pin is in telescoping engagement with the surfaces of the walls of the sprue bushing passage at the exit of the passage into the mold cavity. The molding compound in the transfer well is thus effectively separated from the compound in the mold cavity. The relative positions of the sprue cut-off pin, the sprue bushing and the mold cavity at this point in the molding cycle are illustrated in Fig. 4. The hydraulic cylinder and piston assembly 25 may be actuated by the operator when the descent of the plunger 7 ceases or its operation may be synchronized with the movement of the plunger by any means well known to those skilled in the art so that the operation of the apparatus is automatic from the time that the plunger 7 begins its downward movement until the molding operation is completed.

Figure 5:
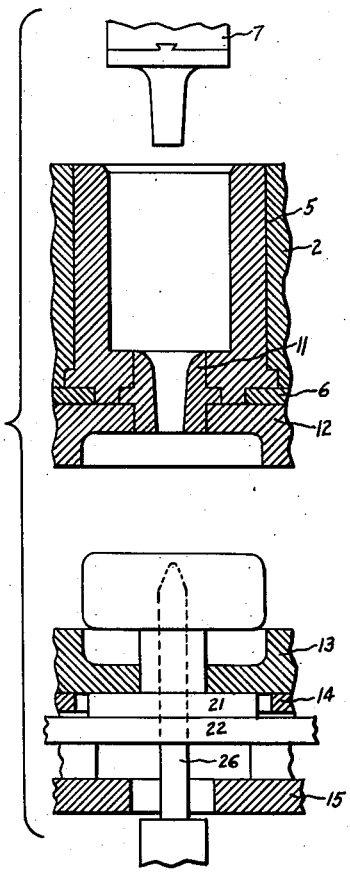
Fig. 5 is a vertical view in cross section, showing the mold in open position and the molded part elevated above the lower section of the mold ready for removal.

Sufficient time is allowed for the molding compound in the molding cavity to cure to the hard and infusible state and the mold is then opened by means of the cylinder 19 and ram 18 in the base of the apparatus which causes the moving platen 16 and mold shoe 13 to descend. As the moving platen descends, the lower end of the vertical members 23 abut against the base member 1 causing the upper end of the vertical members to force ejector bar 22 and ejector pin 21 upward. As the upper end of the ejector pin enters the mold cavity the molded part is elevated above the mold shoe so as to facilitate removal of the molded part from the apparatus. Figure 5 illustrates the relative arrangement of the various parts of the machine and the finished molded part with the mold in the open position at the end of the molding cycle. The sprue cut-off pin may be returned to its initial or retracted position by means of the cylinder and piston assembly 25 at any time in the molding cycle after the molding compound in the mold cavity and sprue bushing passageway has been cured or hardened.

Figure 6:
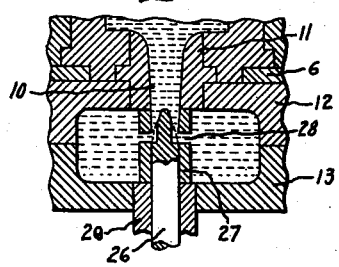
Fig. 6 is a vertical cross sectional view of a device embodying our invention for molding a caster wheel including a central insert as a bushing member for the caster.

It is frequently desirable, for purposes of wear resistance or mechanical strength, to provide metal inserts in molded plastics parts. Fig. 6 illustrates the application of our invention to the molding of parts containing metal inserts. More specifically, by way of example, there is shown in Fig. 6 a mold for a caster wheel, the caster wheel being provided with a metal insert or bushing 27, the walls of which contain apertures 28. The lateral surface of the sprue cut-off pin 26 is shaped to correspond to the inner surface of the insert. At the initial or retracted position of the cut-off pin, the tapered portion of the pin is adjacent the apertures in the bushing walls, as shown in Fig. 6, so that the plasticized molding compound may flow from the transfer well, through the passage in the sprue bushing and the central space in the insert, and into the mold cavity through the apertures 28. When the mold cavity is filled the cut-off pin moves to its advanced or final position so that the plasticized molding compound in the mold cavity is cut off from the residual compound at the apertures 28. As the cut-off pin moves to its final position, the molding compound is forced from the upper part of the insert and into the passage in the sprue bushing.

While the invention has been described by reference to particular embodiments thereof, it will be understood by those skilled in the art that numerous modifications may be made without departing from the invention. We, therefore, aim in the appended claim to cover all such equivalent variations as come within the true spirit and scope of the foregoing disclosure.

What we claim as new and desire to secure by Letters Patent of the United States is:

In a device for transfer molding a thermosetting molding compound, a mold having a stationary part and a movable part, said parts defining a mold cavity when the movable part is positioned against said stationary part, a transfer well for plasticizing said molding compound, a passage in said stationary mold part interconnecting the transfer well and the mold cavity, means for forcing plasticized molding compound from the transfer well through the aforesaid passage into the mold cavity, an aperture in said movable part, an ejector member movable in said aperture, said ejector member having an opening therethrough aligned with the exit of the passage into the mold cavity, and a sprue cut-off member movable in said opening into and out of telescoping engagement with the exit of the passage into the mold cavity, means including a hydraulic cylinder and piston for moving said cut-off member, and means for limiting the downward movement of said ejector member as the movable mold part moves away from said stationary part.

MARVIN E. GALE.
FRANK W. WARNER.

REFERENCES CITED

The following references are of record in the file of this patent:

UNITED STATES PATENTS

| Number | Name | Date |
|---|---|---|
| 1,322,502 | Gullborg | Nov. 18, 1919 |
| 1,916,495 | Shaw | July 4, 1933 |
| 1,988,506 | Pack | Jan. 22, 1935 |
| 1,997,074 | Novotny | Apr. 9, 1935 |
| 2,111,857 | Jeffery | Mar. 22, 1938 |
| 2,244,816 | Von Lynn | June 10, 1941 |